United States Patent
Isham et al.

(10) Patent No.: US 10,866,327 B2
(45) Date of Patent: Dec. 15, 2020

(54) MANUFACTURE OF PLASTIC SCINTILLATION DOSIMETERS

(71) Applicant: AngioDynamics, Inc., Latham, NY (US)

(72) Inventors: John Isham, Houston, TX (US); Eric Hyman, Houston, TX (US); Adam Hoch, Houston, TX (US)

(73) Assignee: AngioDynamics, Inc., Latham, NY (US)

( * ) Notice: Subject to any disclaimer, the term of this patent is extended or adjusted under 35 U.S.C. 154(b) by 0 days.

(21) Appl. No.: 16/545,337

(22) Filed: Aug. 20, 2019

(65) Prior Publication Data

US 2020/0041660 A1 Feb. 6, 2020

Related U.S. Application Data

(63) Continuation of application No. 16/057,299, filed on Aug. 7, 2018, now Pat. No. 10,429,517.

(60) Provisional application No. 62/542,370, filed on Aug. 8, 2017.

(51) Int. Cl.
| | |
|---|---|
| G01T 1/02 | (2006.01) |
| G01T 1/20 | (2006.01) |
| G01T 1/161 | (2006.01) |
| G01T 1/203 | (2006.01) |
| G02B 6/44 | (2006.01) |

(52) U.S. Cl.
CPC ............ *G01T 1/023* (2013.01); *G01T 1/161* (2013.01); *G01T 1/201* (2013.01); *G01T 1/2002* (2013.01); *G01T 1/2033* (2013.01); *G02B 6/4486* (2013.01)

(58) Field of Classification Search
CPC ......... G01T 1/201; G01T 1/023; G01T 1/161; G01T 1/2002; G01T 1/2033; G02B 6/4486
See application file for complete search history.

(56) References Cited

U.S. PATENT DOCUMENTS

2012/0281945 A1* 11/2012 Lepke .................. G01T 1/201
385/12

* cited by examiner

*Primary Examiner* — Mark R Gaworecki
(74) *Attorney, Agent, or Firm* — Peter J. Flora, Esq.

(57) ABSTRACT

A radio-opaque plastic scintillator detector (PSD) for use in various medical applications and methods of making and using the PSD. The method requires coating a plastic scintillator fiber with a radio-opaque material; cutting the scintillator fiber; stripping the end of a plastic fiber optic fiber; cutting the naked end of a plastic fiber optic fiber; inserting a closely fitting guide tube over the naked end and inserting the cut scintillating fiber into the guide tube; coating the detector end of the cable with a light opaque polymer or jacket and adding a connector to the other end.

20 Claims, 7 Drawing Sheets

FIGURE 7

MANUFACTURE OF PLASTIC SCINTILLATION DOSIMETERS

PRIOR RELATED APPLICATIONS

This invention claims priority to U.S. 62/542,370, filed on Aug. 8, 2017, which is incorporated by reference in its entirety herein for all purposes

FIELD OF THE INVENTION

The invention relates to methods of making radiation sensors, the sensors themselves, and methods of use for brachytherapy, external beam radiation therapy and other radiation based treatments.

BACKGROUND OF THE INVENTION

A scintillator is a special material that exhibits scintillation—the property of luminescence when excited by ionizing radiation. Luminescent materials, when struck by an incoming particle, absorb its energy and scintillate, in other words they reemit the absorbed energy in the form of light.

A scintillation detector or scintillation counter is obtained when a scintillator is coupled to a light sensor such as a photomultiplier tube (PMT), charge-coupled devices (CCD), PIN photodiodes, and the like. The light sensor will absorb the light emitted by the scintillator and reemit it in the form of electrons via the photoelectric effect. The subsequent multiplication of those electrons (sometimes called photo-electrons) results in an electrical pulse that can be analyzed and provides meaningful information about the particle that originally struck the scintillator. In this way, the original amount of absorbed energy can be detected or counted.

The term "plastic scintillator" typically refers to a scintillating material where the primary fluorescent emitter, called a fluor, is suspended in a solid polymer matrix. While this combination is typically accomplished through the dissolution of the fluor prior to bulk polymerization, the fluor is sometimes associated with the polymer directly, either covalently or through coordination, as is the case with many Li6 plastic scintillators. Polyethylene naphthalate has been found to scintillate without any additives and is expected to replace existing plastic scintillators due to its higher performance and lower price.

The advantages of plastic scintillators include fairly high light output and a relatively quick signal, with a decay time between 2-4 nanoseconds. The biggest advantage of plastic scintillators, though, is their ability to be shaped, through the use of molds or other means, into almost any desired form with a high degree of durability.

In the field of medical radiation therapy, plastic scintillation detectors or "PSDs" are used to convert radiation energy into light energy, and the light photons are counted to accurately determine the radiation dose. The scintillating plastic must transfer its photons to a device that can read them, which is commonly done by coupling one or more scintillating fibers to one or more plastic optical fibers (POF). The POF is then connected to a device that can read and analyze the optical output.

A PSD sensor or dosimeter is made of three major building blocks: the scintillating probe, a light guide and a photodetector—together called the "optical chain." The linearity between the dose and light output depends on each component in the optical chain, each stage added in the path of the optical photons leading to a decrease in efficiency.

First, the visible light produced in the scintillator must travel (through internal reflection) toward the exit face of the scintillator and into the light guide (e.g. an optical fiber) (collection efficiency of about 5%). The interface between various components, e.g. scintillator to optical guide, is also a source a loss and the coupling efficiency is generally around 75-85%. Optical fibers, in particular the water-equivalent and flexible plastic types, are often used because of their enhanced light transport properties. Light attenuation in an optical fiber guide is generally less than 20% over a few meters. The output of a light guide must then be captured by a photodetector. Depending on whether the coupling to the photodetector is direct or not, passing through filters or a lens (or a combination thereof), the coupling efficiency can be as low as 5% and as high as 90%. Finally, the photodetector itself possesses an intrinsic efficiency (quantum efficiency), which can vary from 20% to 90%. The overall efficiency over the complete optical chain is thus only of a few percent and optimization of each component is important.

Manufacturing a high volume of such PSD sensor cables is difficult because an accurate and repeatable connection of the plastic scintillator fiber to the plastic optical fiber is required. The problem arises from working with small diameter optical fibers that must be constructed accurately, yet at a low cost. Thus, what are needed in the art are netters methods if making PSD sensors, better PSD sensors, and improved treatment methodologies that are provided by improved PSD sensor.

BRIEF SUMMARY OF THE INVENTION

Generally speaking, the invention relates to tiny plastic scintillator radiation detector cables, suitable for medical uses, methods of fabricating same, and various applications therefor. The tiny and inexpensive scintillator-based dosimeters are used to assess radiation dosage in real time, and provide a tremendous advance in the field, which previously lacked tiny, inexpensive detectors for use inside a body cavity at the actual location of the radiation therapy.

Applications include brachytherapy, external beam radiation therapy, stereotactic radiosurgery/stereotactic radiotherapy (SRS/SRT), intensity modulated radiation therapy (IMRT), dynamical arc therapy, tomotherapy treatments, and any similar application where radiation sensing in a small area is needed, including non-medical applications. Particularly preferred applications include use in brachytherapy and radiation treatments of tumors and such.

In one embodiment, the plastic scintillator detector cable consists of a single, short length of scintillator fiber optically coupled to a suitable length of optic fiber, which has a standard data coupler or connector at the end of the cable opposite the scintillator fiber. The scintillator detector is thus at the distal end of the cable and a suitable data coupler is at the proximal end, and the entirety of the cable is enclosed in a flexible, opaque covering. This radiation dosimeter can be called a PSD sensor or PSD cable herein. Together with the detector unit and software allowing conversion to dose, the entire system is a PSD dosimeter system.

In another embodiment, the PSD cable is hardwired directly to a photodetector, thus avoiding connector use. However, the use of the connector is preferred as it allows for quick and easy replacement of damaged cables.

In another embodiment, the PSD cable has at least two separate, but closely juxtaposed, plastic scintillator detectors. The two detectors are parallel, but offset from one another in the longitudinal axis, so that radiation can be simultaneous assessed at two ends of a target, such as on either end of the prostrate or both ends of an irradiated throat area, and the like.

In another embodiment, an additional fiber optic cable without plastic scintillator detector can be added thereto, and can serve the function of allowing the subtraction of any background signal, which can arise from the inherent dark current of the PMT or mostly Cerenkov light generated in the fibers. However, these effects are negligible for photon beams, and thus this extra cable is not needed.

Additional plastic scintillation detectors can be added if desired to assess radiation in three or more places along a longitudinal radiation axis. However, single scintillation detectors can also be used where sufficient for the application in question, e.g., where the area to be irradiated is quite small.

Where it is desired to assess radiation levels over more than, one axis, e.g., with a larger radiation zone, a second plastic scintillator detector cable can be added, somewhat offset from the first cable (offset in the axis perpendicular to the cable), although this will obviously increase the overall size and cost of the device accordingly. Alternatively, two PSD sensor cables can be used.

The scintillator detector can be combined with any medical device suitable for insertion into a body cavity, such as a prostate balloon, vaginal balloon, catheter, needle, brachytherapy-applicator, surgical implements, and the like.

For balloon usage, a small strip of balloon material can be welded to the outer surface thereof, and the scintillator cable threaded therethrough, thus reliably positioning the detector on the outer surface of the balloon. Alternatively, the cable can be placed inside the balloon and held with one or more spot welds and/or small strips of balloon material or other attachment means. As yet another alternative, the catheter can be a multilumen catheter, one of the lumens used to host the PSD sensor.

For solid medical devices, such as brachytherapy applicators, a small tube can be affixed thereto or integral therewith, and the tiny cable threaded inside the small tube, or the PSD cable can be affixed directly to the applicator. Alternatively, a removable balloon can be provided for the applicator, such as is already described. The PSD cable can also be threaded inside a catheter or needle, and other device used to access a body cavity.

The scintillator detector cable has any suitable data connector or adaptor at the proximal end thereof, and is plugged into any existing or dedicated signal detection and computer system for collecting, analyzing (e.g., converting to dosage) and outputting the data collected by the scintillator detector.

Suitable connectors include SMA, FDDI, ESCON, SMI, SCRJ, and the like, and will of course vary according to the system that is intended to be used with the scintillator detector cable. The data connectors can be single connectors, even for a dual or triple detector embodiment, but preferably a dual connector is used for the dual detector embodiment, etc., which keeps the cables neat and can prevent plugging sensors into the wrong channels.

Because the scintillator detector is quite small, novel fabrication methods were developed to allow cost effective, reliable manufacture and assembly therefore. In our first models, a special cap was used to allow the scintillator fiber to be reliably connected to the fiber optic cable. This cap is essentially tube shaped with a blind end, such that the scintillator fiber fits entirely into the blind end, and the fiber optic cable fits behind it. Thus, the hollow interior closely holds the ends of the two fibers in close juxtaposition (direct contact or "abutting") without the need for any adhesive on the ends of the two fibers, which greatly improves both sensitivity and reliability. The hollow interior is thus shaped to closely fit the naked fibers, and in many instances will have a circularly cross-section, although this can of course vary if the fiber cross section is varied.

This invention takes the next step in our evolving PSD sensor technology, making a PSD sensor cable that is 0.5 mm in diameter (except for the connector) and is radiopaque for use in various imaging modalities. The method is robust and scalable, and provides a PSI) sensor that can be seen in X-ray, MRI, CT and the like, allowing accurate positioning for use.

First, the scintillating fiber is dipped in a tantalum bath to provide radiopaque coating that is visible during imaging. Other radio-opaque materials could also be used, and other methods of application, such as spraying, painting, vapor deposition, and the like, could also be used. Once the coating has dried, hardened, or cured, the fiber is cut to length, as described below.

A hot knife blade can be used for cutting each fiber, thereby eliminating the need for polishing. A soldering iron set to 700° F. may be used with a fine point carbon steel blade having a thickness of 0.0235 inches (0.06 cm). Other hot knifes, temperatures, and blade thicknesses are also contemplated, and it is known how to vary the temperature with the material being used. Many industrial hot-knives are available for use, and cutting blocks that function to ensure a 90° cut are also commercially available. Although a hot knife was originally preferred, other cutting methods can be substituted, including laser, water jet, diamond saw, and the like. In fact, we are now using a laser cutter as provide a very clean cut not requiring polishing.

The optical fiber is also cut as described above, and a portion of the jacket stripped off for access and manipulation. A close-fitting tube—e.g., a polyimide tube—is slid over the diameter of the optical fiber. Next, a tiny amount of optically transparent epoxy is inserted into the tube, followed by the cut piece of coated scintillating fiber. The fiber is gently coaxed into position against the optic cable, a minute amount of epoxy therebetween. The scintillating fiber slightly sticks out of the tube when bonded in place (approximately 0.5 mm).

Preferably, the epoxy is placed on the sides of the fiber, so that when the tube is placed thereover, the fiber optic has a clean end. The same is repeated with the scintillator, thus the two fibers directly abut one another with no glue therebetween. However, with optically clear epoxy, and good technique, it is also possible to provide an a cable where the two components are adhered therebetween them.

The final step is to render the entire PSD cable light opaque. This can be done by dipping the entire distal end of the sensor cable (up to including the distal end of the jacket of the optical fiber) in a black light tight polymer or paint in order to prevent stray light from entering the sensor cable. Alternatively, a heat shrink polyester jacket with carbon black color can be used. Combinations thereof are also possible.

Tantalum is one of the radio-opaque materials that has the property of blocking X-rays during medical imaging, thus suitable for being used in imaging. Its bioinertness and relatively inexpensive price makes it suitable for an additional radio-opaqueness in the PSD.

Other radio-opaque materials include any heavy dense metal, such as iodine, cobalt, gold, bismuth, barium, tungsten, iron, and compounds or alloys containing same. Barium sulfate ($BaSO_4$) was the first radiopaque material to be widely compounded in medical formulations and is the most common filler used with medical-grade polymers because it is very inexpensive at about 2$/lb. Bismuth is another such material, but is more expensive than barium at 20-30$/lb. A fine metal powder with a specific gravity of 19.35, tungsten (W) is more than twice as dense as bismuth and can provide a high attenuation coefficient at a moderate cost of 20$/lb. Barium sulphate, bismuth trioxide ($Bi_2O_3$), bismuth subcarbonate ($Bi_2O_2CO_3$) and bismuth oxychloride (BiOCl) are still commonly used in medical devices.

In addition to tantalum, radiopaque inks may also be applied to the scintillator by additional dipping or printing or adherence of printed labels. Radio opaque inks are designed for printing tags or reference points that are visible when exposed to X-ray, MRI or other fluorescing or imaging equipment. The inks are used to print adhesive skin patches or topical tags, or imprinted onto surgical devices, tools or other items requiting tracking. Currently, the preferable radiopaque inks in this application includes polyurethane-based ink.

Alternatively or in addition thereto, an exterior coating of heat shrinkable material can be added thereto for good strength and fit. The shrink tubing covers at least the detector end of the device up to and including at least a portion of the jacketed. PDF, and protects the detector, while keeping the components together in a tight bundle that remains flexible and can move in all directions. The shrink tubing can also cover most or all of the cable, but this will generally not be needed since plastic optical fibers are usually already jacketed, although the heat shrinkable tubing will also function to keep the fibers tightly bundled and thus may be of benefit.

Many suitable jacket plastics are known, and preferably are opaque plastics of low antigenicity or medical grade, although any plastic can be used and combined with an appropriate biocompatible coating. Such materials include low smoke zero halogen (LSFH), polyvinyl chloride (PVC), polyethylene (PE), polyurethane (PUR), polybutylene terephthalate (PBT), polyamide (PA), and the like.

Particularly preferred jacket materials are medical grade polyurethanes due to their lack of plasticizers and which are available in a variety of hardness, ranging from 60 Shore D to 90 Shore A. Particularly preferred are softer plastics of 70-80 Shore A and which give the cable considerably flexibility combined with sufficient strength. However, the polyurethane may need to overlay an opaque plastic, such as black PVC, unless opaque pigments are added thereto or an opaque paint is applied thereto.

By contrast, it is preferred that the detector end of the PSD is stiffer to protect the scintillating fiber. It will already be stiffer, by virtue of the guide tube used in assembly, but the overcoating of the sensor end with a tougher polymer will also help.

Also preferred are cable materials that withstand sterilization procedures, such as autoclaving, gamma irradiation or chemical treatments, although sterilization may be optional if combined with a separately sterilizable balloon that can completely contain the sensor, or if a non-sterile device is needed, e.g., for rectal applications.

In more detail, the invention includes any one or more of the following embodiment(s) in any combination(s) thereof:

| A method of manufacturing an radio-opaque plastic scintillation detector (PSD) sensor cable, comprising: |
| --- |
| a) coating a plastic scintillator fiber with a suspension comprising a radio-opaque material in a binder; |
| b) cutting said coated plastic scintillator fiber to generate a light exit end; |
| c) stripping one end of a plastic fiber optic fiber to generate a naked end and a jacketed end; |
| d) cutting said naked end to generate a light entry end; |
| e) inserting a closely fitting guide tube over said naked end; |
| f) inserting said light exit end against said light entry end inside said guide tube; and |
| g) Coating or covering any protruding coated plastic scintillator fiber and said guide tube and said naked end up to and overlapping said jacketed end with a light opaque polymer; and |
| h) optically coupling a connector to a terminus of said jacketed end. |
| A Method of manufacturing an radio-opaque plastic scintillation detector (PSD) sensor cable, comprising: |
| a) coating a plastic scintillator fiber with tantalum, Wherein the coating is applied either with a combination of a binder fluid and tantalum powder, or with a suspension comprising tantalum in a binder; |
| b) cutting said coated plastic scintillator fiber with a hot Knife or laser cutter to generate a light exit end; |
| c) stripping one end of a plastic fiber optic fiber to generate a naked end and a jacketed end; |
| d) cutting said naked end with a hot knife or laser cutter to generate a light entry end; |
| e) inserting a closely fitting guide tube over said naked end; |
| f) inserting said light exit end against said light entry end inside said guide tube; |
| g) coating or covering any protruding coated plastic scintillator fiber and said guide tube and said naked end up to and overlapping said jacketed end with a tight opaque polymer; and |
| h) optically coupling a connector to a terminus of said jacketed end. |
| Any method herein described, wherein said radio-opaque material is iodine, cobalt gold, bismuth, barium, tungsten, and compounds or alloys containing same. |
| Any method herein described, wherein said plastic scintillator fiber is dipped in a suspension comprising tantalum powder in polyethylene oxide or polyurethane or both polyethylene oxide and polyurethane. |
| Any method herein described, wherein said plastic scintillator fiber is dipped at least 5 times, ar at least 10 times. |
| Any method herein described, wherein the plastic scintillator fiber is dipped in a suspension comprising tantalum powder having a mean particle size of about 3 μm in polyethylene oxide or polyurethane or both polyethylene oxide and polyurethane. |
| Any method herein described, wherein the polyethylene oxide has a molecular weight of 100,000 to 500,000. |
| Any method herein described, wherein the polyurethane is QuadraflexTM ARE. |

-continued

Any method herein described, wherein the tantalum suspension comprises 60-80 wt % of the tantalum powder and 20-40 wt % of the polyethylene oxide or the polyurethane.
Any method herein described, wherein said connector is an SC connector or an SMA connector.
Any method herein described, wherein said plastic scintillator fiber is a polystyrene-based fiber with green or blue light emission.
Any method herein described, wherein said light opaque polymer is a heat shrink polymer, or a heat shrink polymer with depth indicia printed thereon.
Any method herein described, wherein said light opaque polymer is
Any method herein described, wherein said light opaque polymer is a heat shrink polymer with depth indicia printed thereon in medical grade ink.
Any method herein described, wherein said light entry end directly abuts said light exit end with no adhesive therebetween.
A PSD sensor made by any of the methods herein.

A method of treatment of a cancer, comprising:

a) inserting the PSD sensor described herein, to a patient at or near a cancerous target site;
b) imaging the PSD sensor and adjusting its position as needed to position said PSD sensor at said target site;
c) connecting said connector of said PSD sensor to a photodetector;
d) delivering radiation to said patient and measuring an amount of delivered radiation;
e) ceasing said delivery and recording said amount of delivered radiation; and
f) removing said PSD sensor from said patient.

A method of treatment of a cancer, comprising:

a) inserting the PSD sensor described herein into a radiation delivery device;
b) inserting said radiation delivery device and said PSD sensor into a patient at or near a cancerous target site;
c) imaging the PSD sensor in said patient and adjusting its position as needed to position said radiation delivery device and said PSD sensor at said target site;
d) connecting said connector of said PSD sensor to a photodetector;
e) delivering radiation to said patient and measuring an amount of delivered radiation;
f) ceasing said delivery and recording said amount of delivered radiation; and
g) removing said radiation delivery device and said PSD sensor from said patient.

BRIEF DESCRIPTION OF THE DRAWINGS

A better understanding of the present invention can be obtained with the following detailed descriptions of the various disclosed embodiments in the drawings.

DETAILED DESCRIPTION OF THE INVENTION

Figure 1A:
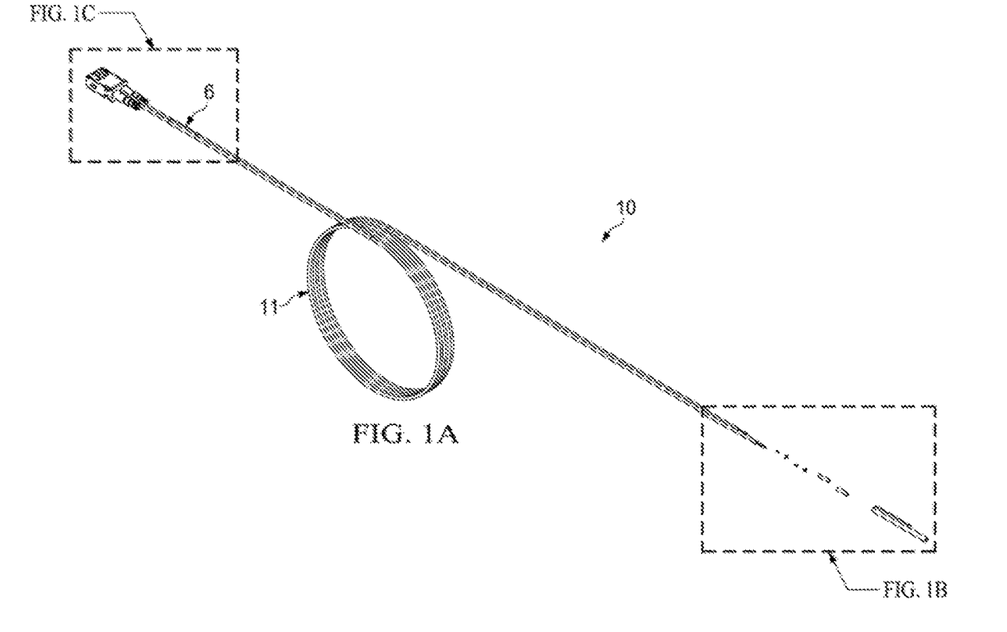
FIG. 1A is a perspective view of a partially coiled duplex scintillator cable, with adaptor at the proximal end and exploded scintillator detectors at the distal end.
Figure 1B:
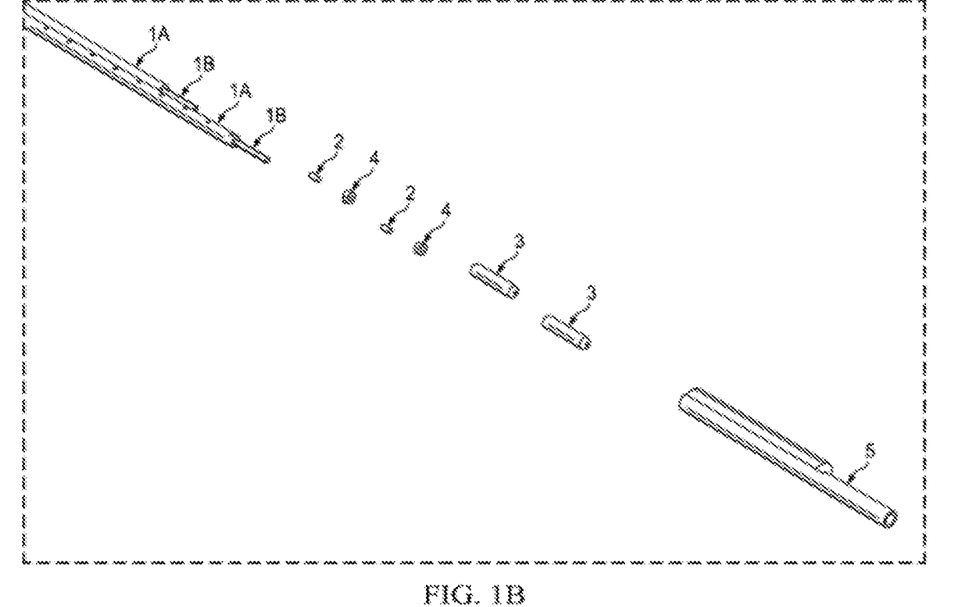
FIG. 1B is a detail exploded view in area B of FIG. 1A of two exposed duplex optical fibers, two scintillating fibers, two rings of adhesive, two fiber caps, and a heat shrink tubing.

Turning to FIG. 1, a duplex scintillation detector cable 10 has a first and second optical fibers 1. The jacket or covering 1A has been stripped or removed from the portion of the first optical fiber 1 adjacent to the distal ends of each fiber, leaving a portion of each optical fiber in exposed. First and second scintillating fibers 2 are shown, along with drop of adhesive 4 and fiber cap 3. The length of scintillating fibers 2 can be varied, according to needed sensitivity and size of area to be assessed, but typically 1-10 mm of length will suffice. We have used 2-3 mm lengths in prototypes.

Figure 1C:
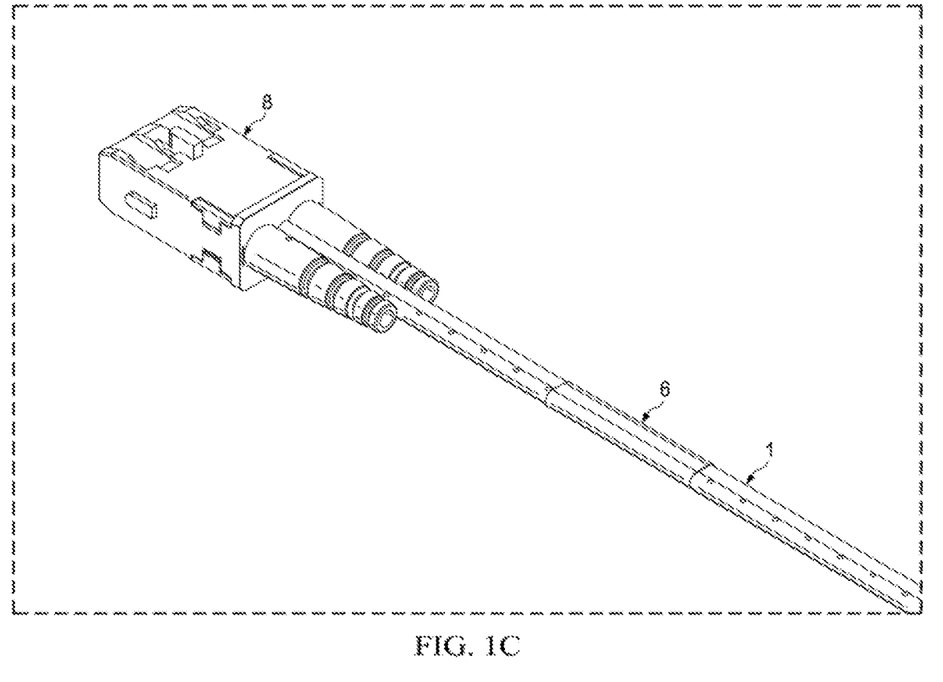
FIG. 1C is a detail view in area C of FIG. 1A showing the adaptor.
Figure 2:
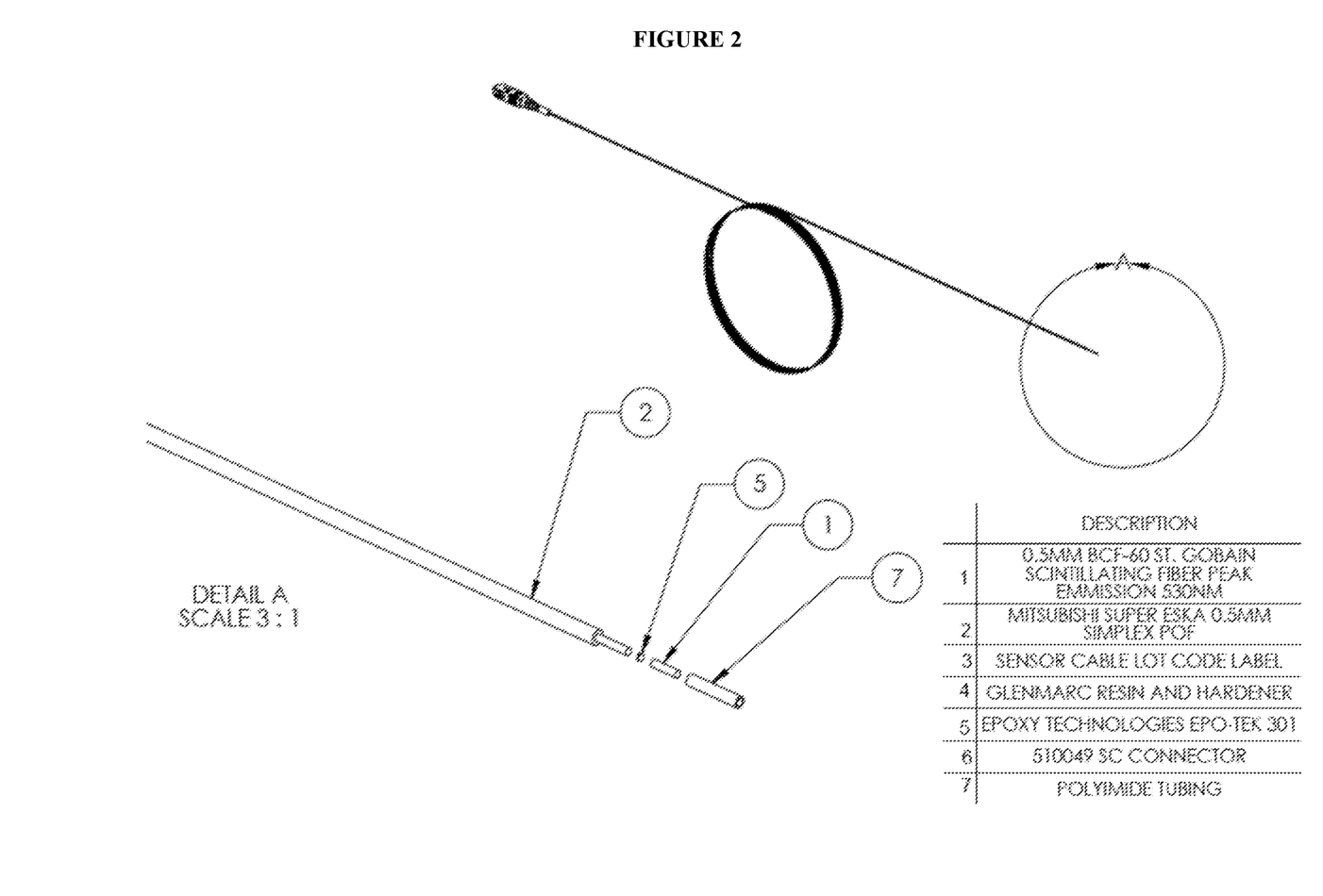
FIG. 2. A perspective view of a PSD sensor showing enlargement area A.
Figure 3:
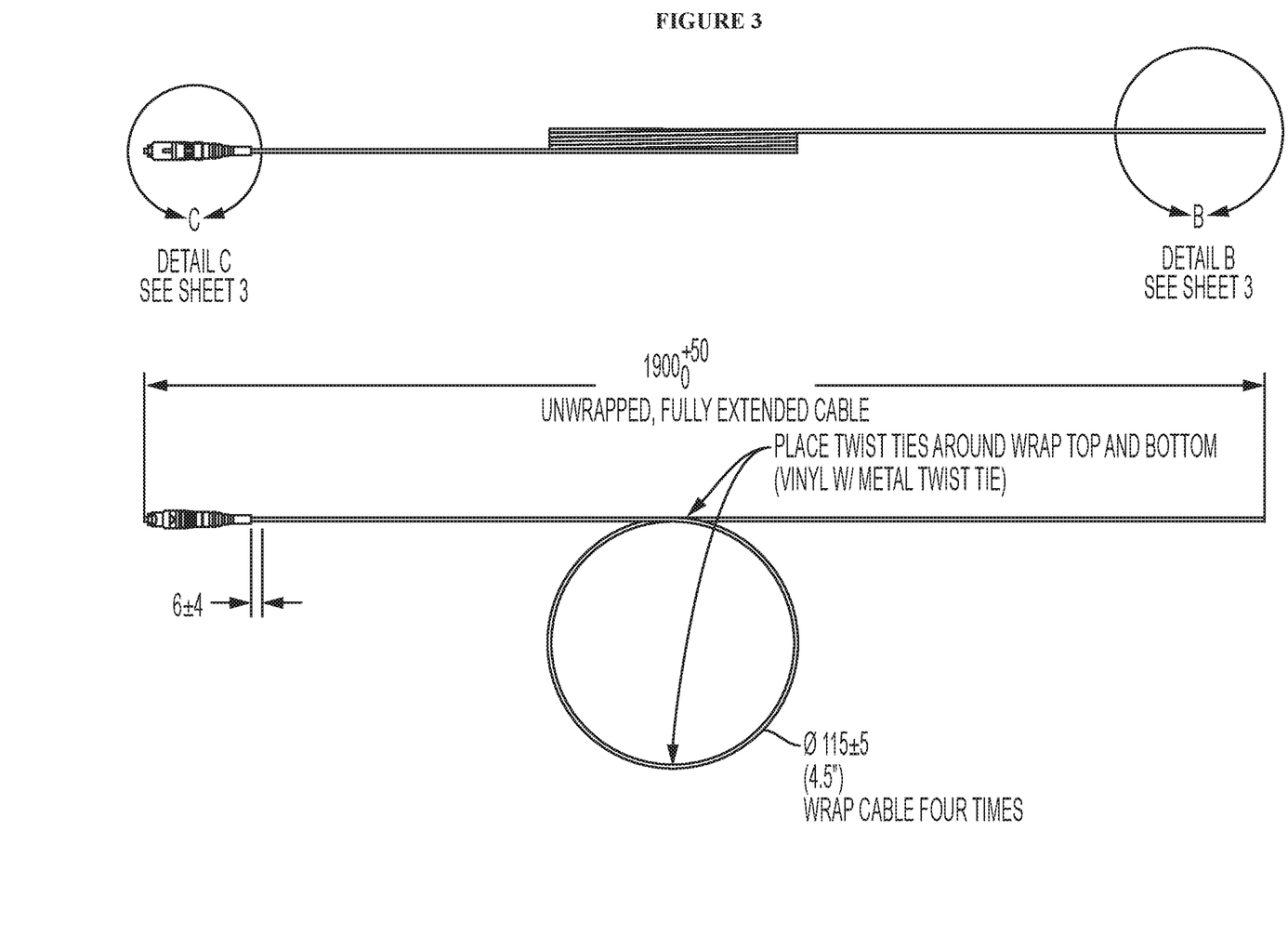
FIG. 3 Aide and top views of a PSD sensor showing enlargement area B and C.
Figure 4:
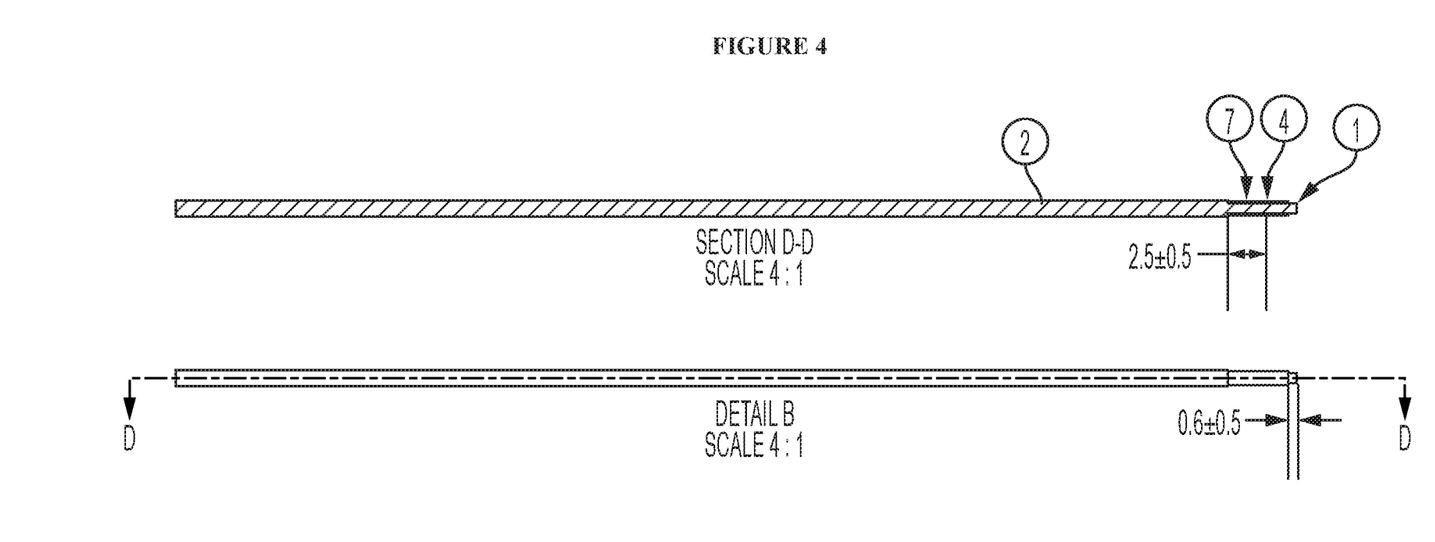
FIG. 4 enlargement view B of sensor end of PSD cable.

The scintillating fibers 2 fit into the fiber caps 3, followed by the naked optic fibers 1B, and a drop of epoxy 4. Heat shrink tubing 5 covers the components. At the far end, an adaptor 8 is found, in this case a dual jack adaptor. Label 6 is also shown, but may be placed anywhere on the cable or even on packaging and is not considered material. There is no adhesive 4 on the abutted ends or faces of the respective scintillating fibers 2 and optical fibers 1B, thus signal is optimized, but this is optional.

The duplex optical fiber 1 may be a Super Eska 1 mm duplex plastic optical fiber SH4002 available from Mitsubishi Rayon Co., Ltd. of Tokyo, Japan, although other duplex optical fibers are also contemplated. Although duplex optical fibers 1 are shown, it is also contemplated that a single optical fiber may be used or additional fibers can be added.

The scintillating fibers 2 may be a BCF-60 scintillating fiber peak emission 530 NM available from SAINT-GOBAIN CERAMICS & PLASTICS™, Inc. of Hiram, Ohio, although other scintillating fibers are also contemplated. This fiber emits green (530 nm) with a light yield of 7100 photons/MeV.

Standard fibers by St. Gobain consist of a polystyrene-based core and a PMMA cladding. The scintillating core contains a combination of fluorescent dopants selected to produce the desired scintillation, optical and radiation-resistance characteristics. Multi-clad fibers have a second layer of cladding that has an even lower refractive index and, thus, permits total internal reflection at a second boundary. The additional photons guided by multi-clad fibers increase the output signal up to 60% over conventional single-clad fibers. External EMA (optional) is often used to eliminate optical crosstalk.

Current sizes range from 0.25 mm to 5 mm square or round cross-sections and available in canes, spools, ribbons and arrays.

Scintillating fibers are well-suited for such applications as industrial gauging, calorimeters, real-time imaging systems, and for dosimeter use, as described herein.

FIG. 2-5 show the cable as assembled by the method of the invention. In these figures, 1 is the scintillator fiber that has been dipped in a tantalum bath. A preferred scintillator fiber is a 0.5 mm BCF-60 by St Gobain with emission at 530 nm.

The plastic optic fiber 2 is a Mitsubishi ESKA, POF Simplex, 0.5 mm core with opaque jacket, but other POFs may be suitable. Polymer optical fiber has a concentric double-layer structure with high-purity polymethyl methacrylate (known as PMMA) core and specially selected transparent fluorine polymer cladding. The cladding has a lower refractive index than that of the core. This special structure efficiently keeps the launched light power from dissipating.

POF 2 is connected to the scintillator fiber 1 via epoxy 4, and supported in close juxtaposition by tube 7. Here we have used a polyimide tube, but any suitable tube could be used. In order to assemble these components, the POF 2 jacket is stripped at the end, leaving a 0.5-1.5 inch segment of naked POF fiber 2B. Tube 7 is then fit over this naked end.

Next, about 0.1-1 μl, preferably about 0.2 μl of epoxy is placed on the sides of scintillator, and the cut scintillator fiber also inserted into the tube, gently guiding it to come to rest against the cut POF end. Any optically transparent epoxy can be used, but we have selected EPO-TEK® 301, a low viscosity, low temperature cured (65° C./1 hour), optically clear, two component epoxy adhesive. This adhesive previously passing the standard ISO10993 testing, has now successfully passed the more extensive testing of 12 weeks implantation.

Typically a small amount (0.5-2 mm) of scintillator fiber protrudes from the end of the tube, but this is not essential and is a matter of convenience of assembly.

Once the sensor end is assembled, it is dipped into an opaque polymeric material to block light. Preferably this material also provides some strength or stiffening, and as such acts to protect the delicate sensor end.

Figure 5:
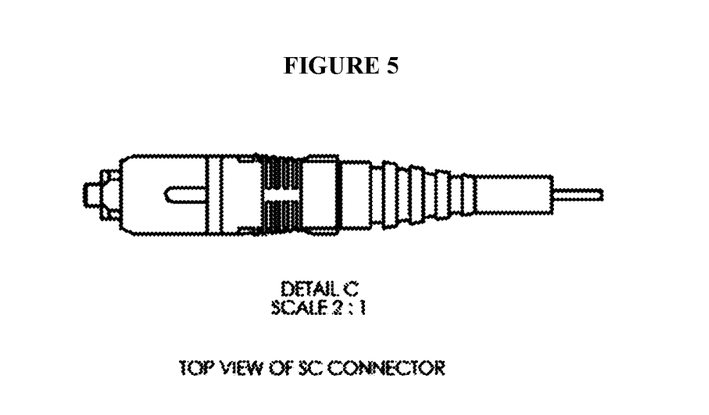
FIG. 5 enlargement view C of SC connector end of PSD cable.

Connector 6 is added to the proximal end of the POE cable by known means. We have selected an SC connector (SFP-WDM-155M-20A LC by Elpa), which has a data rate of 100/155 Mbit/s, wavelength 1480-1580 nm, peak at 1310 nm, a sensitivity of −28 dBm, and power output −14 dBm minimum to −8 dBm maximum, with an input maximum at −8 dBm. However; there are many suitable connectors and the connector will vary with the photodetector employed to read the signal.

If the POE core is 0.5 mm, the whole cable must be at least 0.6 mm with the various coatings thereon, but can be as much as 1 mm. It is still small enough, however, to be used in in vivo applications, even on a urinary catheter, which is quite small.

Any suitable photodetector can be used with the above sensor, including those base on silicon photomultipliers (SiPMs), photomultiplier tubes, PIN photodiodes, multicolor cameras, monochromatic cameras, avalanche photodiode (APD); Charge-coupled devices (CCD), and the like. Selection may vary with the application—The PIN, APD and PMT have higher sensitivity, suitable for low dose rate and out-of-field dose monitoring. PMT's relative uncertainty remains under 1% at the lowest dose rate achievable (50 μGy/s), suggesting optimal use for live dosimetry. For dose rate above 3 mGy/s, the PIN diode is the most effective photodetector in term of performance/cost ratio. For lower dose rate, such as those seen in interventional radiology, PMTs are the optimal choice. See also Ser. No. 15/135,576, filed Apr. 22, 2016, and 62/150,852, filed Apr. 22, 2015, entitled "MONOLITHIC PHOTODIODE DETECTOR FOR DOSIMETER."

To provide additional detail on manufacturing methods, two alternative methods are provided for adding radioopacity to the PSD sensor cable.

In the first method, the following steps are performed: (1) creating a solution of tetrahydrofuran (THF) and an aromatic polyurethane (Quadraflex QFLEX-ARE series, for example QFLEX-ARE-93A-SG-001-000, available from BioMetrics LLC, Utah) at 10% solids referred to as solution in this paragraph; (2) placing sufficient amount of tantalum powder in a container that can be fully closed in order to allow proper reaction and avoid any escape of the tantalum powder in the later shaking steps; (3) cleaning an approximately 4 inch length of scintillating fiber with acetone and ethanol; (4) dipping the scintillating fiber in the solution, preferably to the depth of the cleaned length of the scintillating fiber; (5) transferring the dipped fiber into the container with tantalum powder and then coated the fiber with tantalum using a vigorous shaking method; (6) repeating steps 4 and 5 for a total of five shakes and six dips; and (7) allowing the coating to cure at room temperature for 3 hours or in an oven at 110-120° F. for 30 minutes.

Separating the dipping step from the shaking step allows an even application of tantalum powder on the scintillating fiber with the binder polymer. Specifically, shaking the polymer-dipped scintillator fiber with a sufficient amount of tantalum powder ensures the maximum tantalum adhesion throughout the dipped polymer. In other words, this allows denser tantalum powder on the scintillator fiber in each shaking step, which leads to reduced number of shaking needed to achieve sufficient imaging clarity, thereby reducing the overall required time for manufacturing the scintillator fiber.

Alternatively, the scintillator fiber is cleaned using a suitable solvent and then dipped into a tantalum and polymeric binder solution between 1 and 10 times with a set amount of time between dips to allow solution on the cable to begin to dry. After all dips are completed, the cable is then placed in an oven to cure at temperatures between 100° F. and 140° F. for between 1 and 10 hours. With this method, about 10 dips are required to give sufficient tantalum for imaging. A thicker solution may require fewer dips, but the thin solution minimized aberrations that may occur due to dripping or slumping, and gives a very precise, even coating.

To make the tantalum dip suspension, tantalum powder is suspended in a polymeric solution that will adhere to the fiber. Polyethylene oxide or polyurethane can be used, or a mix of same can be used to improve binding. An exemplary tantalum suspension may comprise 60-80 wt % of tantalum powder having an average particle size of 1-5 μm, preferably about 3 μm, suspended in a solution of 20-40 wt % of polyethylene oxide, and optionally 20-40 wt % of polyurethane in place of the polyethylene oxide.

In either method, tantalum powder having mean particle size of 1-3 μm can be obtained from, for example, SigmaAldrich. Polyethylene oxide having molecular weight of 100,000-500,000 can be obtained from, for example, SigmaAldrich 181986 (average Mv 100,000), 181994 (average Mv 200,000), or mixtures thereof. Polyurethane can be obtained from, for example, Biomerics, LLC (Quadraflex™ ARE series).

The dipping could cover the entire length of the scintillator fiber, but is not necessary. Dipping a radiopaque material to a certain length would be sufficient to provide a distinguishable shape and size under current medical imaging practices, and would provide a non-dipped tip that can be held or clamped for the dipping procedure. In one embodiment, the scintillator fiber is dipped in a tantalum suspension to a length of 0.1-1.5 inch, preferably about 0.5 inches, leaving a small tip undipped for clamping or otherwise holding onto the fiber for the dipping process. The fiber can then be cut into several segments for use. If shorter fragments are dipped then the light exit end should still be cut after dipping so that light transmission is not interfered with by the polymer.

The tantalum coated scintillator fiber is cut and then inserted into the tube so that it abuts the POF, and the entire end of the sensor dipped in a light blocking solution or coating. Alternatively, a heat shrinking opaque jacket could be used.

While any suitable jacket material can be used, we have used one that not only blocks light, but also stiffens the fiber for further protection. For the light lock and stiffener dipping, a polyurethane solution is first created, and then the polyurethane based ink is added before dipping the sensor tip. An exemplary dipping solution for light lock and stiffener may comprise 30-50 wt % of polyurethane, and 50-70 wt % of a polyurethane based ink.

In one embodiment, we place a medical grade ink pad printed polyester shrink tubing over the assembly to add calibration depth markers to the cable to allow the Physician to adjust the placement depth after initial imaging and pull back or insert to adjust the location into the perfect position.

The polyurethane can be obtained from, for example, Biomerics, LLC (QFLEX-ARE-93A-SG-003-000). The clear grade of polyurethane QFLEX-ARE-93A has a specific gravity of 1.14, a flex modulus (psi) of 7,000, an ultimate tensile (psi) of 6,500, a ultimate elongation (%) of 575, a tensile at 100% (psi) of 1,500, and tensile at 300% (psi) of 2,500), and a mold shrinkage (in/in) of 0.007-0.011.

The opaque jacket or coating should cover the entire length of the sensor tip down to the original POF jacket, but it can cover more if desired. Dipping a light lock ink to a certain length would be sufficient to provide a distinguishable shape and size under current medical imaging practices. In one embodiment, the sensor is dipped in the polyurethane/ink solution to a length of 1-2 inches.

The PSD sensor can be used with a brachytherapy applicator, a balloon, a catheter, or any surgical or medical device. For example, U.S. Pat. No. 7,678,040 describes separate vaginal and prostate balloons that can be used with the PSD sensor. U.S. Pat. Nos. 7,727,137, 7,918,778, and 7,678,040 also describe brachytherapy applicators with integral balloons. Each of these patents is incorporated by reference herein in its entirety for all purposes.

Figure 6:
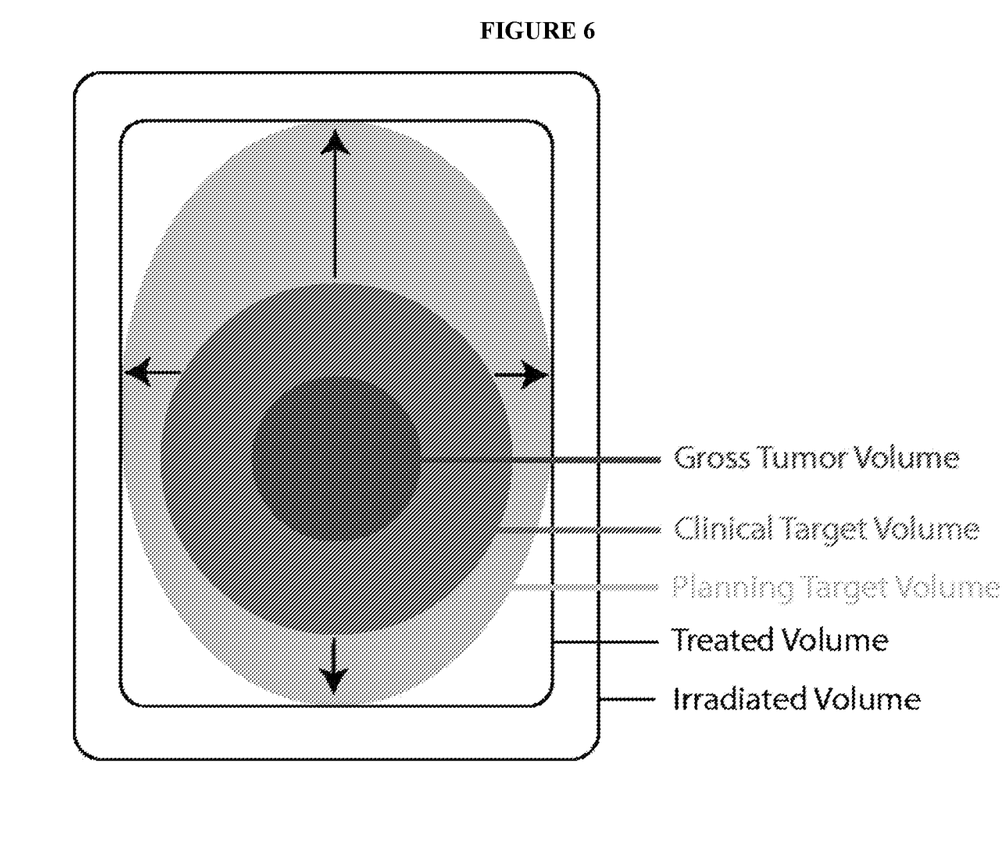
FIG. 6 Dosing graphic.

In order to accurately plan the brachytherapy procedure, a thorough clinical examination is performed to understand the characteristics of the tumor. The gross tumor volume (GTV) is determined by imaging and clinical target volume (CTV), planned treatment volume (PTV), and organs-at-risk (OAR) are delineated (FIG. 6).

A range of imaging modalities can be used to visualize the shape and size of the tumor and its relation to surrounding tissues and organs. These include x-ray radiography, ultrasound, computed axial tomography (CT or CAT) scans and magnetic resonance imaging (MRI), and the like. The data from many of these sources can be used to create a 3D visualization of the tumor and the surrounding tissues.

Figure 7:
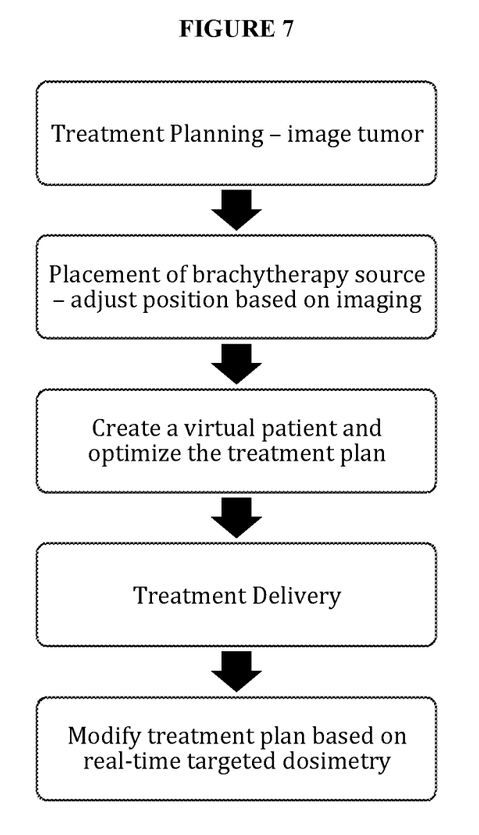
FIG. 7 Method of use.

Using this information, a plan of the optimal distribution of the radiation sources can be developed (FIG. 7). This includes consideration of how the source carriers (applicators), which are used to deliver the radiation to the treatment site, should be placed and positioned. Applicators are non-radioactive and are as described herein, having with at least one lumen sized to accept the afterloader, and at least one lumen sized to fit a PSD sensor cable. This initial planning helps to ensure that 'cold spots' (too little irradiation) and 'hot spots' (too much irradiation) are avoided during treatment, as these can respectively result in treatment failure and side-effects. It also helps to reduce dosage to the OAR.

Before radioactive sources can be delivered to the tumor site, the applicators have to be loaded with the PSD sensors, unless they are sold as a combined unit. The assembled brachytherapy applicator with PSD sensor cables is inserted into the body cavity, the balloon (if any) inflated, and the device positioning confirmed by imaging, such that the device is correctly positioned in line with the initial planning. Imaging techniques, such as x-ray, fluoroscopy and ultrasound are typically used to help guide the placement of the device to the correct position and to further refine the treatment plan. With the tantalum dipped scintillation fiber, one can see exactly where the sensor is, and adjust the position of the brachytherapy applicator or balloon accordingly.

Once the brachytherapy applicator plus PSD sensors are inserted, and positioning confirmed, the handle e.g., can be held in place against the skin using sutures or adhesive tape or clamp to prevent them from moving. If desired, further imaging can be performed to guide detailed treatment planning.

The images of the patient with the applicators in site are imported into treatment planning software. The treatment planning software enables multiple 2D images of the treatment site to be translated into a 3D 'virtual patient', within which the position of the applicators can be defined. The spatial relationships between the applicators, the treatment site and the surrounding healthy tissues within this 'virtual patient' are a copy of the relationships in the actual patient.

To identify the optimal spatial and temporal distribution of radiation sources, the treatment planning software allows virtual radiation sources to be placed within the virtual patient. The software shows a graphical representation of the distribution of the irradiation. This serves as a guide for the brachytherapy team to refine the distribution of the sources and provide, a treatment plan that is optimally tailored to the anatomy of each patient before actual delivery of the irradiation begins. This approach is sometimes called 'dose-painting'. Herein, dose painting can be greatly improved with real-time feedback about delivered radiation. The sensor cables can also provide dose information about the source.

The radiation sources used for brachytherapy are always enclosed within a non-radioactive capsule. The sources can be delivered manually, but are more commonly delivered through a technique known as 'afterloading'. Afterloading involves the accurate positioning of non-radioactive steerable applicator adjacent or in the treatment site, which are subsequently loaded with the radiation sources. In manual afterloading, the source is delivered into the applicator by the operator.

Remote afterloading systems are preferred as they provide protection from radiation exposure to healthcare professionals by securing the radiation source in a shielded safe. Once the applicators are correctly positioned in the patient, they are connected to an 'afterloader' machine (containing the radioactive sources) through a series of connecting guide tubes. The treatment plan is sent to the afterloader, which then controls the delivery of the sources along the guide tubes into the pre-specified positions within the applicator. This process is only engaged once staff have exited the treatment room. The sources remain in place for a pre-specified length of time, again following the treatment plan, following which they are returned along the tubes to the afterloader.

At some point, the sensor cables have to be connected to a photodetector system for real-time measurement of the dose. This can be done at any point in the procedure, but it is likely that the optimal time will be after accurate positioning and before connecting to the afterloader.

Once the afterloader is connected, treatment can commence, and dosimetry can be measured on a real-time basis at targeted locations via the PSD sensors within the applicator. Adjustments to positioning and/or total dosage or delivery rates can be made based on this real-time feedback, and the adjustments can be applied immediately, or in the next treatment session, as appropriate. Once the desired dosage level is reached for a given treatment session, the treatment is stopped, and the user can then reposition the applicator for a second target site (if any). This can be repeated as often as necessary to target the tumor.

On completion of delivery of the radiation, the devices are disconnected from the afterloader and photodetector. The balloon (if any) is deflated, and the device is carefully removed from the body. Patients typically recover quickly from the brachytherapy procedure, enabling it to often be performed on an outpatient basis.

Use with external beam therapy is similar, although no radiation source is included with the delivery, since the radiation is provided by external beams. Thus, just the PSD sensor and the medical device it is housed in are applied to the patient, and the radiation beamed at the patient from several different angles, the crossing point providing the treatment area. In external beam therapy, a treatment safety "margin" is planned for that allows for small movements of the target with breathing, peristalsis, etc. With better dose monitoring, it may be possible to reduce the treatment margin, thus saving healthy tissue from being irradiated.

The term "distal" as used herein is the end of the device inserted into the body cavity, while "proximal" is opposite thereto and is closest to the medical practitioner deploying the device. The terms top and bottom are in reference to the figures only, and do not necessarily imply an orientation in usage. The length of applicator plus handle and cables is the longitudinal axis, while a horizontal axis and vertical axis cross the longitudinal axis, and the cross sections are shown across the longitudinal axis.

As used herein the "GTV" or gross tumor volume is what can be seen, palpated or imaged.

As used herein "CTV" or "Clinical Target Volume" is the visible (imaged) or palpable tumor plus any margin of subclinical disease that needs to be eliminated through the treatment planning and delivery process.

The third volume, the planning target volume (PTV), allows for uncertainties in planning or treatment delivery. It is a geometric concept designed to ensure that the radiotherapy dose is actually delivered to the CTV.

Radiotherapy planning must always consider critical normal tissue structures, known as organs at risk "OAR". In some specific circumstances, it is necessary to add a margin analogous to the PTV margin around an OAR to ensure that the organ cannot receive a higher-than-safe dose; this gives a planning organ at risk volume.

As used herein, a "cold spot" is a decrease of dose to an area significantly under the prescribed dose. While there is no hard fast rule as to what quantifies a cold spot, numbers greater than 10% below prescription should be scrutinized. A "hot spot" is the opposite, an area receiving >10% over prescription.

As used herein, "fractionation" refers to radiation therapy treatments given in daily fractions (segments) over an extended period of time, sometimes up to 6 to 8 weeks.

"High Dose Rate" or "HDR" brachytherapy is the delivery of brachytherapy on an outpatient basis using HDR brachytherapy equipment. The actual treatment delivery last approximately 5-10 minutes in contrast to a hospital stay that might take several days for low-dose rate (LDR) brachytherapy. HDR is almost always done with remote afterloader devices due to the high exposures hospital personnel would receive if they stayed in the room with the patient during administration.

By "inflation" herein what is mean is inflation to the recommended pressure level, thus the volume will vary according to the size of the device, but typically range from 40-70 cc, or about 50-60 or 55 cc for a vaginal balloon, and 80-120 for a rectal balloon.

By "radio-opaque" what is meant is a material that obstructs the passage of radiant energy, such as x-rays, the representative areas appearing light or white on the exposed film. In preferred embodiments, the devices are asymmetrically marked with a radio-opaque material such that placement and orientation can be reproducibly achieved with every treatment.

By "summation shadow" what is meant is when parts of a patient or an object in different planes are superimposed. The result is a summation image representing the degree of X-Ray absorption by all the superimposed objects. Radiolucent summation shadows are formed in the 'Swiss cheese' effect. Radiopaque summation shadows are involved in the 'bunch of grapes' effect.

By "silhouette effect" what is meant is the fact that when two structures of the same radiopacity are in contact, their individual margins at the point of contact cannot be distinguished. One is said to silhouette with the other, or to form a positive silhouette sign.

By "PSD sensor" or "PSD cable" or "PSD sensor cable", what is meant is the light opque cable with adaptor at one end and plastic scintillating tip at the other, when connected with a photodetector and a computer system for substracting background and converting the received light to dose, a "PSD dosimeter system" is created.

The use of the word "a" or "an" when used in conjunction with the term "comprising" in the claims or the specification means one or more than one, unless the context dictates otherwise.

The term "about" means the stated value plus or minus, the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim. The term "consisting of" is a closed linking verb, and does not allow the addition of other elements.

The term "consisting essentially of" occupies a middle ground, allowing non-material elements to be added. In this case, these would be elements such as marking indicia, radio-opaque markers, a stopper, packaging, instructions for use, labels, and the like.

The following abbreviations may be used herein:

| | |
|---|---|
| ABS | Acrylonitrile butadiene styrene |
| ADP | avalanche photodiode |
| APBI | Accelerated partial breast irradiation |
| CCD | Charge-coupled devices |
| CRT | Conformal radiation therapy |
| CT | computer tomography |
| CTV | Clinical Target Volume |
| DVH | dose-volume histogram |
| EBRT | External beam radiation therapy, sometimes XRT |
| GTV | Gross tumor volume |
| HDR | High dosage rate |
| IGRT | Image guided radio therapy |
| IMRT | intensity-modulated radiation therapy |
| IV | Irradiated volume |
| LDR | Low dosage rate |
| MPPC | Multipixel photon counter |
| MRI | magnetic resonance imaging |
| OAR | Organ at risk |
| PCB | Printed circuit board |
| PDR | Pulsed dosage rate |
| PEEK | Polyether ether ketone |
| PET | position emission tomography or polyethylene terephthalate |
| PIN | p-type semiconductor - intrinsic semiconductor - n-type semiconductor region. PIN diode is a diode with a wide, undoped intrinsic semiconductor region between a p-type semiconductor and an n-type semiconductor region. |
| PMT | Photomultiplier tubes (photomultipliers for short), vacuum phototubes are extremely sensitive detectors of light in the ultraviolet, visible, and near-infrared ranges of the electromagnetic spectrum. These detectors multiply the current produced by incident light by as much as 100 million times (i.e., 160 dB), in multiple dynode stages, enabling (for example) individual photons to be detected when the incident flux of light is low. |
| POF | Plastic optic fiber |
| PRV | Planning organ-at-risk volume |
| PTV | Planning target volume |
| PVC | Poly vinyl chloride |
| RVR | Remaining volume at risk |
| SIPM | Silicon photomultiplier, see also MPPC |
| TV | Treated volume |
| XRT | radiation therapy |

The foregoing disclosure and description of the invention are illustrative and explanatory thereof, and various changes in the details of the illustrated apparatus and system, and the construction and method of operation may be made without departing from the spirit of the invention.

Each of the following is incorporated by reference herein in its entirety for all purposes:

Boivin, J. et al., Systematic evaluation of photodetector performance for plastic scintillation dosimetry, Med, Phys. 42(11): 6211-6220 (2015).

Lessard, F., et al., Validating plastic scintillation detectors for photon dosimetry in the radiologic energy range, Med Phys. 39(9): 5308-5316 (2012).

Wootton L. & Beddar, S., Temperature dependence of BCF plastic scintillation detectors, Phys Med Biol. 58(9): 10.1088/0031-9155/58/9/2955 (2013).

US20140221724, US20140221724, U.S. Pat. No. 8,735,828 "REAL-TIME IN VIVO RADIATION DOSIMETRY USING SCINTILLATION DETECTOR" by Beddar Ser. No. 15/135,576, filed Apr. 22, 2016, and 62/150,852, filed Apr. 22, 2015, entitled "MONOLITHIC PHOTODIODE DETECTOR FOR DOSIMETER"

US20100288934, US20140018675, US20150216491, U.S. Pat. Nos. 9,028,390, 9,351,691, "APPARATUS AND METHOD FOR EXTERNAL BEAM RADIATION DISTRIBUTION MAPPING" by Keppel US20060173233 "BRACHYTHERAPY APPLICATOR FOR DELIVERY AND ASSESSMENT OF LOW-LEVEL IONIZING RADIATION THERAPY AND METHODS OF USE" by Lovoi WO2003062855 "METHOD AND APPARATUS FOR REAL TIME DOSIMETRY" by Rosenfeld

US20100318029 "SEMI-COMPLIANT MEDICAL BALLOON"

U.S. Pat. No. 4,584,991 "MEDICAL DEVICE FOR. APPLYING THERAPEUTIC RADIATION"

US20150335913 "BRACHYTHERAPY APPLICATOR DEVICE FOR INSERTION IN A BODY CAVITY"

61/481,503, filed May 2, 2011, Ser. No. 13/444,584 (now U.S. Pat. No. 8,885,986), filed Apr. 11, 2012, Ser. No. 14/470,707 (now U.S. Pat. No. 8,953,912), filed Aug. 27, 2014 "SMALL DIAMETER RADIATION SENSOR CABLE"

62/049,258, filed Sep. 11, 2014, and Ser. No. 14/849,790 (pending), "SKIN PATCH. DOSIMETER"

62/063,196 filed Oct. 13, 2014, Ser. No. 14/881,023, filed on Oct. 12, 2015 (pending); "URINARY RADIATION SENSOR CATHETER"

What is claimed:

1. A device comprising:
a scintillator fiber, an optical fiber, and a guide tube;
wherein the scintillator fiber is coated with a suspension comprising a radio-opaque material in a binder; and
wherein the guide tube is be coaxially located over at least a portion of the scintillator fiber and at least a portion of the optical fiber.

2. The device of claim 1, wherein the radio-opaque material is comprised of iodine, cobalt, gold, bismuth, barium, or tungsten.

3. The device of claim 1, further comprising an SC connector or an SMA connector.

4. The device of claim 1, wherein the scintillator fiber is a plastic material.

5. The device of claim 4, wherein the plastic material is a polystyrene-based fiber with green or blue light emission.

6. The device of claim 1, wherein at least a portion of the scintillator fiber is coated with a light opaque polymer.

7. The device of claim 6, wherein the light opaque polymer is a heat shrink polymer.

8. The device of claim 7, wherein the heat shrink polymer comprises a depth marker.

9. The device of claim 1, wherein the scintillator fiber is optically coupled to the optical fiber.

10. The device of claim 9, wherein the scintillator fiber is optically coupled to the optical fiber with an adhesive.

11. A device comprising:
a scintillator fiber and an optical fiber;
wherein at least a first section of the scintillator fiber is coated with a suspension comprising a radio-opaque material in a binder;
wherein the scintillator fiber is coupled to the optical fiber.

12. The device of claim 11, wherein the radio-opaque material is comprised of iodine, cobalt, gold, bismuth, barium, or tungsten.

13. The device of claim 12, wherein the scintillator fiber is optically coupled to the optical fiber.

14. The device of claim 13, further comprising a guide tube coaxially placed over at least a portion of the scintillator fiber and at least a portion of the optical fiber.

15. A device comprising:
a scintillator fiber;
wherein at least a first section of the scintillator fiber is coated with a suspension comprising a radio-opaque material in a binder;

wherein at least a second section of the scintillator fiber is covered with a light opaque polymer.

16. The device of claim 15, wherein the radio-opaque material is comprised of any of iodine, cobalt, gold, bismuth, barium, or tungsten.

17. The device of claim 15, further comprising an optical fiber; and
wherein the scintillator fiber is optically coupled to the optical fiber.

18. The device of claim 17, further comprising a guide tube coaxially placed over at least a portion of the scintillator fiber and at least a portion of the optical fiber.

19. The device of claim 15, wherein the scintillator fiber is a plastic material.

20. The device of claim 19, wherein the plastic material is a polystyrene-based fiber with green or blue light emission.

* * * * *